United States Patent
Crummey et al.

(10) Patent No.: US 6,693,895 B1
(45) Date of Patent: Feb. 17, 2004

(54) MULTIPLE SYNCHRONOUS DATA STREAM FORMAT FOR AN OPTICAL DATA LINK

(75) Inventors: Thomas Crummey, London (GB); Richard John Fergusson, Ayrshire (GB); Shaun Kerigan, Renfrewshire (GB); Philip Lane, Herts (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,271

(22) Filed: Jul. 14, 1999

(30) Foreign Application Priority Data

Jul. 14, 1998 (GB) .............................................. 9815136

(51) Int. Cl.[7] .............................................. H04L 12/66
(52) U.S. Cl. ........................ 370/352; 370/466; 370/493
(58) Field of Search .............................. 370/493, 395.1, 370/396, 351, 465, 536–542, 544, 231, 466, 476; 359/173, 154

(56) References Cited

U.S. PATENT DOCUMENTS

| | | | |
|---|---|---|---|
| 4,488,293 A | * 12/1984 | Haussmann et al. | 370/535 |
| 4,863,233 A | 9/1989 | Nienaber et al. | |
| 5,132,827 A | 7/1992 | Smith et al. | |
| 5,132,828 A | 7/1992 | Conner et al. | |
| 5,173,901 A | 12/1992 | DeSomer | |
| 5,392,280 A | * 2/1995 | Zheng | 370/353 |
| 5,396,494 A | 3/1995 | Roposh | |
| 5,450,411 A | 9/1995 | Heil | |
| 5,603,058 A | 2/1997 | Belknap et al. | |
| 5,640,392 A | 6/1997 | Hayashi | |
| 5,703,879 A | * 12/1997 | Proctor et al. | 370/398 |
| 5,761,430 A | * 6/1998 | Gross et al. | 709/225 |
| 5,835,498 A | * 11/1998 | Kim et al. | 370/537 |
| 5,949,791 A | * 9/1999 | Byers et al. | 370/466 |
| 5,991,304 A | * 11/1999 | Abramson | 370/413 |
| 6,151,334 A | * 11/2000 | Kim et al. | 370/468 |
| 6,333,938 B1 | * 12/2001 | Baker | 370/503 |

FOREIGN PATENT DOCUMENTS

EP 0 174 099 A2 3/1986 .......... G06F/3/153

* cited by examiner

*Primary Examiner*—Ajit Patel
*Assistant Examiner*—Chirag Shah
(74) *Attorney, Agent, or Firm*—Carlos Munoz-Bustamante

(57) ABSTRACT

An isochronous output data stream format in which a single n bit word is transmitted as m multiple synchronous data streams where the length of the word transmitted in each data stream is n/m, the output data stream containing multiple isochronous different data rate data streams and one or more asynchronous data stream or streams. One bit from each of the m multiple synchronous data streams are combined and transmitted as a single signal at one of $2^m$ analog levels. Data which is it desired to have a lower error rate than other data is transmitted in the synchronous data stream corresponding to the most significant bit associated with the $2^m$ analog levels. Calibration data is transmitted in the synchronous data stream corresponding to the most significant bit associated with the $2^m$ analog levels, the calibration data also being transmitted distributed over each of the m synchronous data streams.

14 Claims, 7 Drawing Sheets

MULTIPLE SYNCHRONOUS DATA STREAM FORMAT FOR AN OPTICAL DATA LINK

RELATED APPLICATIONS

The present invention is related to the following pending applications:

Application Ser. No. 09/353,724, filed Jul. 14, 1999, and entitled "OPTICAL DATA LINK SYSTEM".

Application Ser. No. 09/353,553, filed Jul. 14, 1999, and entitled "FORMAT FOR AN OPTICAL DATA LINK".

TECHNICAL FIELD

The present invention relates to fibre optic data links and in particular to the merging of multiple separate input data streams into a single data stream for transmission. More particularly, the invention relates to a data format using a single word which includes multiple synchronous data streams of different clock rates and multiple isochronous data streams of different clock rates and one or more asynchronous data stream or streams. This single word is split into multiple synchronous data streams for transmission.

BACKGROUND ART

Prior art methods of data transmission require multiple wire, high cost cables and suffer from limited transfer distance, degraded Front of screen (FOS) performance and Electro-Magnetic Compatibility (EMC) problems. The majority of computer systems at present utilise CRT monitor display systems and it is the analogue nature of the signals required by these display monitors which is responsible for imposing the distance limits over which the data can be delivered. As LCD flat panel monitors become more prevalent, due to decreasing costs, it is no longer required to deliver the data in an analogue format but to use their native digital format for transmission from the PC system unit to the display. Until recently this has been achieved by a double conversion process, firstly digital-analogue and secondly analogue to digital, which allowed the industry standard analogue interface to be used but suffers the problems referred to above and also further signal degradation from the double conversion process.

Fibre optic data links are well known and have the advantages of good noise immunity and high bandwidth. The current technology of fibre optic data links is generally designed for telecommunications applications in which communications over distances of tens of kilometers is required with a very low error rate. Such links are asynchronous digital links having multiple input data streams, and include, for example, ISDN. The data structures in the fibre optic link are very different to that used by the equipment between which communication is taking place by means of the fibre optic link.

Whilst such known fibre optic links work well for telecommunications applications at, for example, 1.0 Gigabits/sec or at 2.4 Gigabits/sec, the cost of the link is high. In telecommunications applications, this cost is shared by the multiple separate pieces of equipment which are using the fibre optic link to communicate.

The benefits of good noise immunity and high bandwidth mean that the use of fibre optic links for non-telecommunications applications is increasing. Such applications are distinguished from telecommunications applications by virtue of the fact that they rarely exceed 150 meters in length and are frequently as short as 2 meters in length.

The cost of a telecommunications type of fibre optic link for such an application is between 10 and 100 times too expensive. The physical size of the equipment for a telecommunications fibre optic data link is too large for easy incorporation into a personal computer, computer display or an input/output sensor. When used as a data link from a personal computer to a computer display, the video data that is sent from the personal computer to the computer display can be permitted to have transmission errors, but the synchronisation (or control) signals cannot be permitted to have transmission errors, otherwise the displayed image will break up and the errors will be visible to the end user.

U.S. Pat. No. 4,863,233 discloses a system for connecting a personal computer to a computer display using three discrete fibre optic cables for each of the Red, Green and Blue video data. Vertical and Horizontal sync signals are added to, for example, the Red and Blue video fibre optic cables. This system is a digital isochronous link having a single input stream.

U.S. Pat. No. 5,132,828 discloses a system for connecting a personal computer to a computer display using a fibre optic cable for each channel of video, the video signals being analog signals. The gain of a video amplifier is compensated to adjust for variations in the gain of the fibre optic link. U.S. Pat. No. 5,132,827 describes a similar system. These systems are analogue video systems.

The information transmitted over a data link can be split into two types of information, asynchronous data and isochronous data. The transmission of isochronous data requires predictable, periodic access to the data link. The transmission of asynchronous data does not require such predictable, periodic access.

European Patent 0 174 099 A describes a system for connecting a computer to a computer display using a fibre optic cable. The fibre optic link is bidirectional carrying unidirectional isochronous video data from the computer to the computer display and asynchronous keyboard control and sound synthesis data from the computer to the computer display and asynchronous keyboard input data, mouse input data and speech input data from the computer display to the computer. The clock frequency for the control data is at the same rate as that for the video data and the control data is in the same format as the video data. The control data is time domain multiplexed with the video data. This system is a digital isochronous link having a single input stream, together with a bidirectional asynchronous link having a multiple input streams.

U.S. Pat. No. 5,450,411 discloses a system in which non-isochronous data streams are merged together with isochronous data streams to form an asynchronous ATM data stream for transmission over an ATM link.

U.S. Pat. No. 5,396,494 discloses a system in which an asynchronous packet transmit bus is provided such that isochronous information packets may be transmitted from a source to a destination with a fixed, constant delay. Arbitration is used between the various transmission sources.

U.S. Pat. No. 5,640,392 discloses a system in which isochronous data is received continuously without interruption and irregular asynchronous data is also received. A single isochronous data stream and a single asynchronous data stream is used. FIFOs are used for storing the isochronous and asynchronous data.

U.S. Pat. No. 5,392,280 discloses a system in which both synchronous transmission and asynchronous transmission are used in an alternating pattern. This is achieved by cell level dynamic slot allocation.

U.S. Pat. No. 5,173,901 discloses a system in which synchronous and asynchronous data streams are transmitted over a single transmission link. The time frames of the input and output cell streams are phase synchronous.

U.S. Pat. No. 5,603,058 discloses a video optimised media streamer having communications nodes receiving digital data from a storage node and transmitting the data to adapters for generating isochronous digital data streams.

It would be advantageous if a combined high speed unidirectional isochronous data link together with an interleaved medium speed bidirectional isochronous data link could be provided. It would also be advantageous if the data rate across the data link could be reduced.

SUMMARY OF THE INVENTION

Accordingly, the invention provides an isochronous output data stream format in which a single n bit word is transmitted as m multiple synchronous data streams where the length of the word transmitted in each data stream is n/m, the output data stream containing multiple isochronous different data rate data streams and one or more asynchronous data stream or streams.

Preferably, one bit from each of the m multiple synchronous data streams are combined and transmitted as a single signal at one of $2^m$ analog levels. This reduces the data rate which needs to be sent across the data link by a factor of m.

Preferably, data which is it desired to have a lower error rate than other data is transmitted in the synchronous data stream corresponding to the most significant bit associated with the $2^m$ analog levels. The most significant bit of the data link is less likely to have data errors than the less significant bits as the signal amplitude is larger, so this is used for such information as synchronisation signals, calibration signals and the like.

Preferably, one of the isochronous data streams is update or refresh data to a display transducer or update or refresh data from a sensor or one of the isochronous data streams is isochronous IEEE1394 data or USB data or STM data or RS-442 data.

Further preferably, one or more of the asynchronous data steams is Asynchronous IEEE1394 data or Asynchronous USB data or DDC data or I²C data or ATM data.

In a preferred embodiment, n=32 and m=4.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
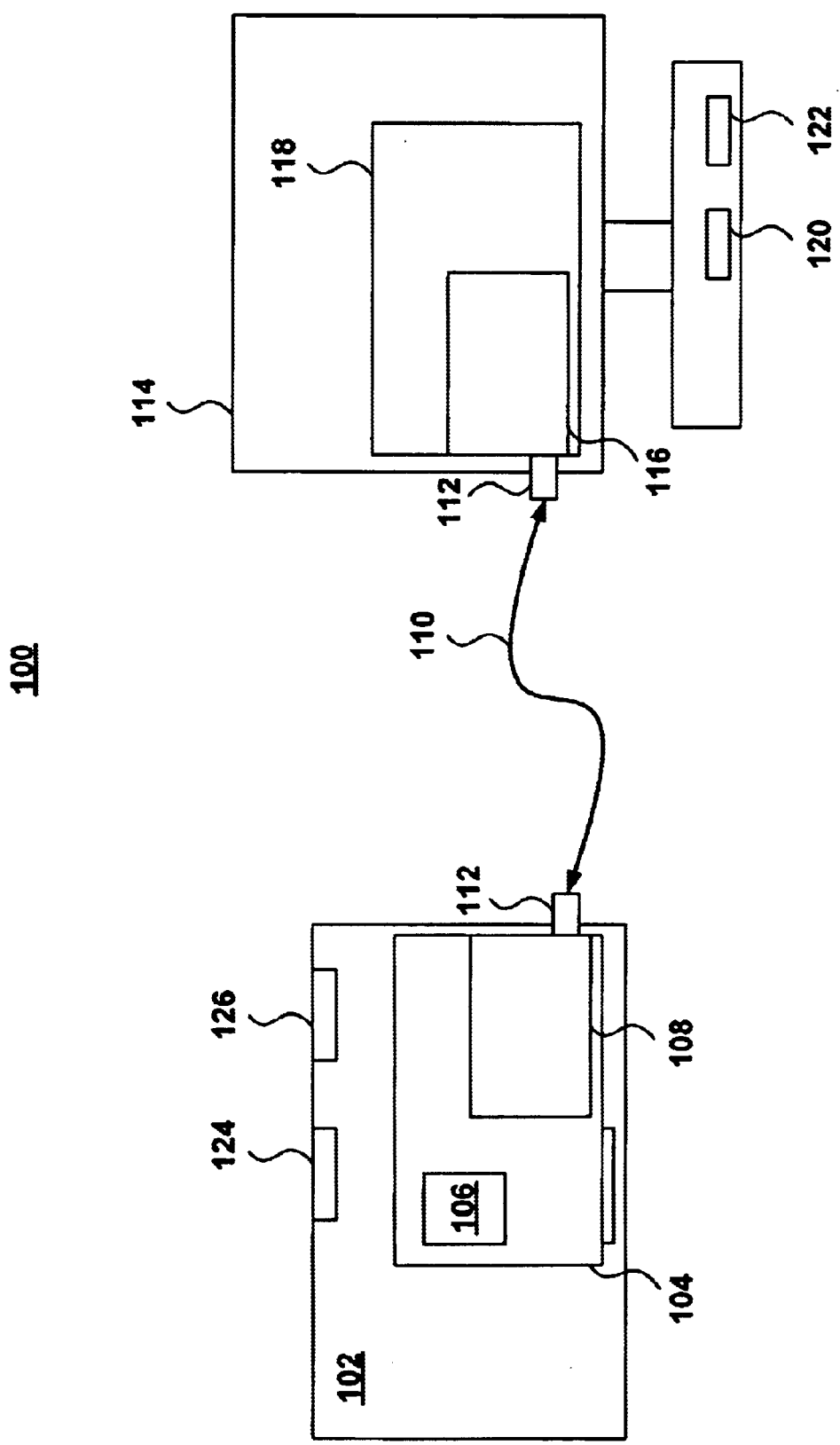
FIG. 1 is a block diagram of a system incorporating the present invention.

The present invention will be described by way of its application to a communications link between a digital adapter in a personal computer and a digital display device. FIG. 1 shows such a system 100. The personal computer 102 includes an adapter card 104 which is connected to an interface bus in the personal computer, such as, for example, a PCI bus. The type of interface bus between the adapter card and the personal computer is not relevant to the operation of the invention. Additionally, the circuitry which will be described with reference to the adapter card may equally well be located on the same circuit card as the processing circuits of the personal computer without affecting the operation of the invention. The adapter card contains a graphics chip set 106 which provides video information for an attached display 114. The adapter card also contains a data encoder 108 for translating the information from the graphics chip set to a format suitable for optical transmission.

The optical data is then transmitted over a bi-directional optical fibre 110 which typically has a length of 2 to 150 meters. The fibre 110 is connected to the personal computer 102 and to the display 114 by means of optical connectors 112, which may be any industry standard optical connector.

When the optical data is received in the display 114, it is first decoded by a data decoder 116 to decode the optical data into electrical data. The data then passes to a display driver card where it is converted to a format suitable for driving the display. Typically the display is a flat panel display, although the invention is also applicable to displays other than flat panel displays.

The display also has connections for other input and output data streams such as a USB bus connector 120 and an IEEE 1394 serial bus connector 122. Further details of the USB can be found in "Universal Serial Bus Specification, Version 1.0" and further details of the IEEE 1394 bus can be found in "IEEE Standard 1394–1995 for a High Performance Serial Bus" (ISBN 1-55937-583-3).

The data transmitted to the computer display consists of video data which is either used to update a shadow refresh buffer in the computer display or is used to refresh the CRT directly without a shadow refresh buffer. Table 1 shows the data rate requirements for a computer display having a shadow buffer in the display and Table 2 shows the data rate requirements for a computer display not having a shadow buffer in the display. The present invention is not limited to use only for the formats shown in tables 1 and 2.

TABLE 1

Update rates for computer displays having shadow buffer in the display

| Format | Resolution | Frame Rate Hz | Pixel Clock MHz | Data Rate (Post Palette) (Megabits/sec) | |
|---|---|---|---|---|---|
| | | | | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 30 | 23.59 | 283.08 | 566.16 |
| SXGA | 1280 × 1024 | 30 | 40 | 480 | 960 |
| VXGA | 2048 × 2048 | 30 | 120 | 1444 | 2888 |
| HDTV | 1280 × 720 | 30 | 27.64 | 331.68 | 663.36 |
| | 1920 × 1080 | 30 | 62.20 | 746.4 | 1492.8 |

TABLE 2

Refresh rates for computer displays not having a shadow buffer in the display

| Format | Resolution | Frame Rate Hz | Pixel Clock MHz | Data Rate (Post Palette) (Megabits/sec) | |
|---|---|---|---|---|---|
| | | | | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 60 | 65 | 780 | 1560 |
| SXGA | 1280 × 1024 | 60 | 112 | 1344 | 2688 |
| UXGA | 1600 × 1200 | 75 | 250 | 3000 | 6000 |
| GXGA | 2560 × 2048 | 75 | 384 | 4600 | 9200 |
| HDTV | 1280 × 720 | 60 | 77.5 | 930 | 1860 |
| | 1920 × 1080 | 30(I) | 77.2 | 926.4 | 1852.8 |

Additionally, control data for the display is transferred to and from the display using the DDC format. Further information on the VESA Data Display Channel (DDC) can be found in "VESA Display Data Channel (DDC) Standard, Version 3".

Figure 2:
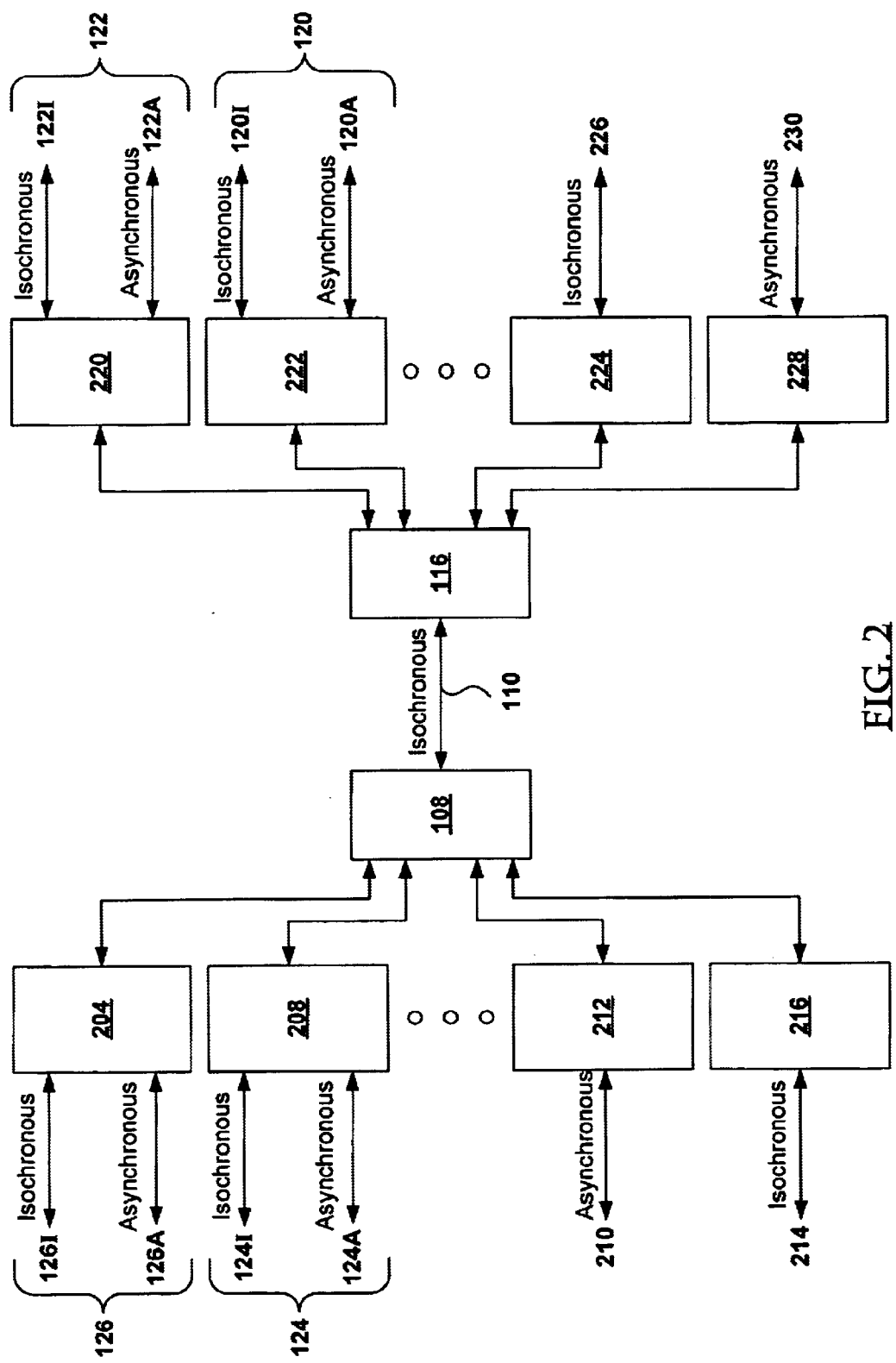
FIG. 2 is a schematic diagram of a system according to the present invention.

FIG. 2 shows a schematic diagram of a system used with the present invention. Isochronous IEEE 1394 data is received and transmitted (126I) from IEEE 1394 driver circuits 204. Asynchronous IEEE 1394 data is received and transmitted (126A) from IEEE 1394 driver circuits 204. The isochronous and asynchronous data flows from connection 126 through encoder 108, optical link 110 and decoder 116 as isochronous data to IEEE 1394 driver circuit 220, where it is split into isochronous data 122I and asynchronous data 122A. Isochronous and asynchronous USB data 124I, 124A from connection 124 is transferred in a similar fashion to connections 120A and 120I.

Asynchronous data 210 is received and transmitted from DDC driver circuits 212. The asynchronous data flows through encoder 108, optical link 110 and decoder 116 to DDC driver circuit 224, where it is transferred to connector 226.

Isochronous video data 214 from video driver circuits 216 flows through encoder 108, optical link 110 and decoder 116 to video driver circuit 228, where it is transferred to connector 230. In contrast to the IEEE 1394, USB and DDC data, which are all bidirectional, the video data is unidirectional data only. There may be any number of IEEE 1394, USB or DDC channels, further channels being shown in FIG. 2 by the three dots between USB driver 208 and DDC driver 212 and by the three dots between USB driver 222 and DDC driver 224.

Figure 3:
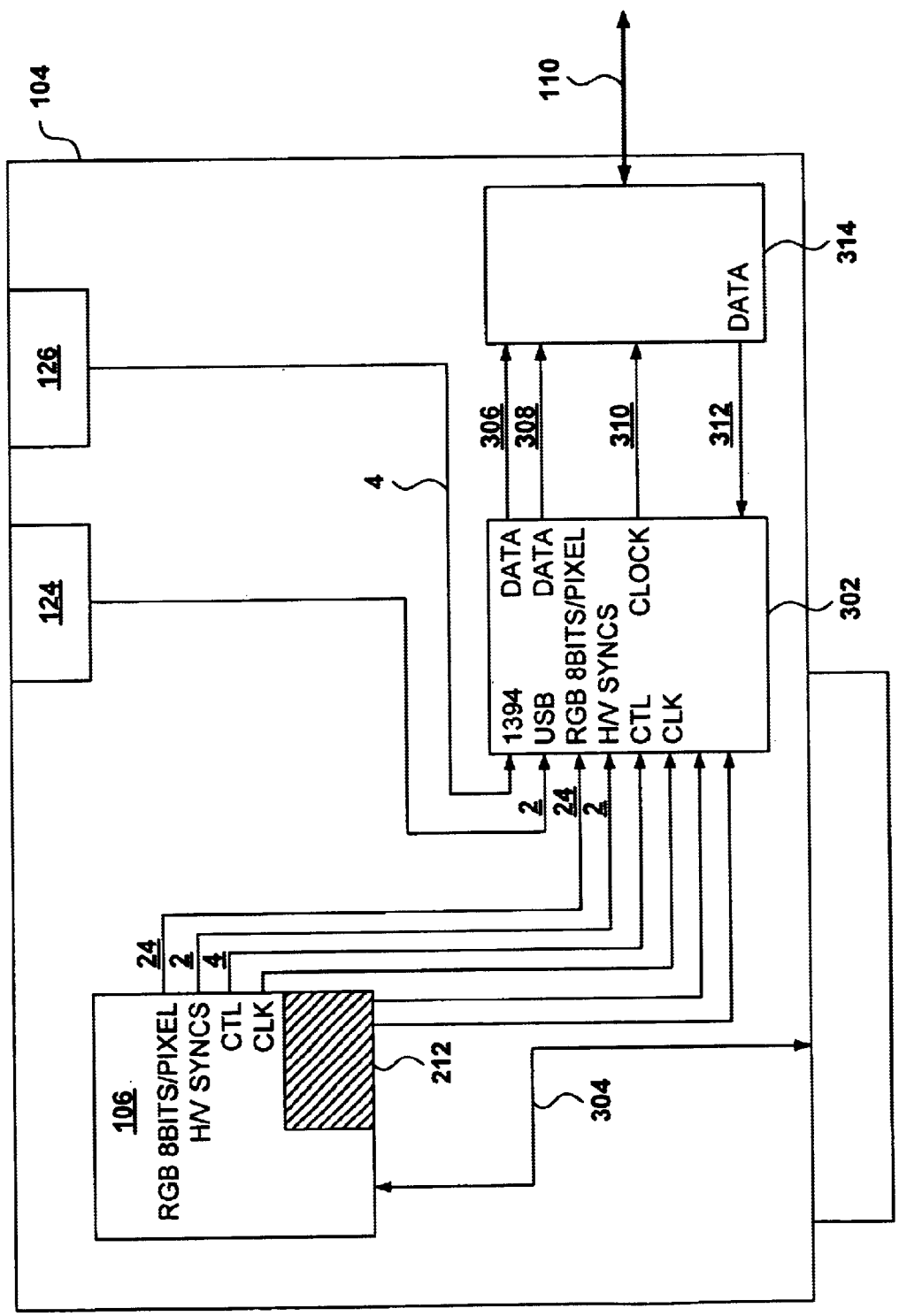
FIG. 3 is a block diagram of an adapter card used in the system of FIG. 1.

FIG. 3 shows a block diagram of an adapter card 104 used in the system of FIG. 1. The adapter card 104 has connections 124 for USB data and 126 for IEEE 1394 data. The graphics chip set 106 produces RGB video data, video control data, display synchronisation signals and a clock signal for use by parallel-serial multiplex encoder 302. These video signals are unidirectional isochronous signals and may be typically 12 bit, 18 bit, 24 bit or 32 bit in format. The invention is equally applicable to other numbers of bits, including numbers greater than 32 bits. For the purposes of description, the present embodiment uses 24 bits. Parallel-serial multiplex encoder 302 converts the 24 bit signals to 26 bit signals and run-length limits (RLL) them. 18 bit format signals received by the parallel-serial multiplex encoder are converted to 24 bit signals by setting the additional 6 bits to zero. The video control signals are encoded to provide error detection and correction in parallel-serial multiplex encoder 302. The video control signals include Data Good, H and V sync, start of frame, EDID good, no data, cal max and cal min.

Additionally, SDA and SCL data are produced from DDC driver 212 located within the graphics chip set and are received by parallel-serial multiplex encoder 302. The DDC signals are bidirectional, asynchronous signals. Graphics chip set 106 has a connection 304 to the personal computer bus. In the preferred embodiment, the personal computer bus is a PCI bus. In an alternative embodiment, the personal computer bus is an AGP bus. Parallel-serial multiplex encoder 302 also transfers data to and from USB connector 124 and IEEE 1394 connector 126. This USB and IEEE 1394 data can be isochronous or asynchronous data or both and is bidirectional data.

The RLL data codes for digital video data, USB data, IEEE 1394 data, DDC data and control hamming code data are merged clock, embed serialised and then DC balanced as is well known in the art. The merged data is now contained within a n bit word. In the preferred embodiment, the value is 32 bits, 24 bits of video data, 5 bits of IEEE 1394 data, 1 bit of USB data and 2 header bits. It is converted from n bit parallel to serial 2 bits wide by multiplexing with pipeline registers to retime the data. The real time bandwidth within the serial data and within the total refresh time slot is allocated isochronously to meet the bus specifications of USB, IEEE 1394 and the data refresh rate requirements.

Parallel-serial multiplex encoder 302 produces 2 bit wide outgoing data signals 306, 308 and an outgoing clock signal 310 for electro-optical converter 314. The n bit encoded word (2 bits wide) is converted to 4 unique light levels at a laser diode, is merged with the return path optical data and is transmitted to fibre optic cable to the display.

Data is received by parallel-serial multiplex encoder 302 from electro-optical converter 314 over connection 312. The return path optical data is converted to binary electrical signals via a pin diode and the clock is recovered in the electro-optical converter 314. The return path data is transferred to parallel-serial multiplex encoder 302 one bit wide where it is decoded into IEEE 1394 data, USB data and DDC data. It is converted from serial to parallel with pipeline registers to retime the data. The IEEE 1394 data, USB data and DDC data are RLL decoded and then separated to their respective original formats. The IEEE 1394 data, USB data and DDC data are converted to their respective specification electrical levels and protocols before being transferred to connectors 126, 124 and the DDC circuitry 212 of graphics chip set 106.

Connections 306, 308, 310 and 312 are preferably implemented using co-axial cable or similar. In an alternative embodiment, electro-optical converter 314 is located in the same integrated circuit as parallel-serial multiplex encoder 302 and so there are no cable connections as such, the connection being contained within the integrated circuit. Electro-optical converter 314 supplies and receives optical data to bi-directional optical fibre 110.

Figure 4:
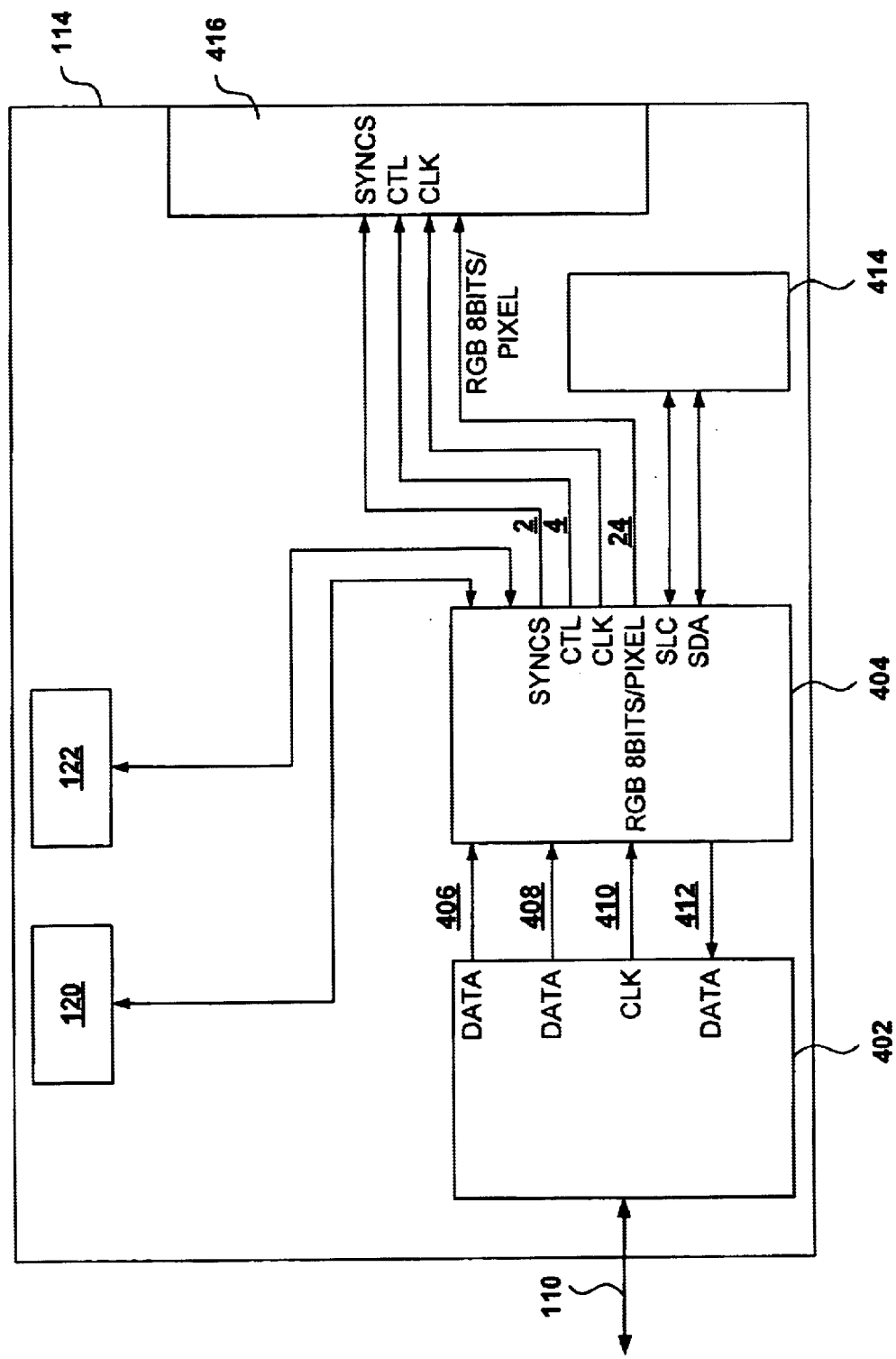
FIG. 4 is a block diagram of a decoder used in the system of FIG. 1.

FIG. 4 shows a block diagram of a decoder used in the system of FIG. 1. Data is received by the optic-fibre receiver circuit 402 from the optical link 110. The receiver circuit 402 converts the data from the optical link 110 from the 4 unique optical light levels to 2 bit wide electrical data signals 406, 408 and a clock signal 410 for the serial-parallel multiplexer 404. The serial-parallel multiplexer 404 converts the n bit data word supplied to it as 2 bit wide electrical data to parallel data with the use of a demultiplexor with pipeline registers to re-time the data without the use of FIFOs. The Synchronisation codes are decoded and error detected and corrected if required. From this decoded data the IEEE 1394 data, USB data, DDC data and Refresh Data Sections of the n-bit data word are separated and RLL decoded back to the original format of the data. The video refresh data with Synchronisation controls is routed to the display connector 408. The USB data is level and protocol converted and is then routed to the USB connector 120. The IEEE 1394 data is level and protocol converted and is then routed to the IEEE 1394 connector 122.

The adapter card 408 has connections 120 for USB data and 122 for IEEE 1394 data. The return path USB data, IEEE 1394 data and DDC data are RLL converted in serial-parallel multiplexer 404 to binary code, transferred over connection 412 and converted to single level optical data in receiver circuit 402. The return path single level optical data is then merged with the incoming four level optical data.

In another embodiment of the present invention, a sensor is connected to the personal computer 102. This embodiment is represented by FIG. 1 but where a sensor replaces the computer display 114. The USB connection 120 and the IEEE 1394 connection 122 remain unchanged. The direction of the unidirectional isochronous data is from the sensor to the personal computer 102, rather than from the personal computer to the computer display 114.

DDC data may still be sent from the sensor to the personal computer 102.

ENCODING METHODS

Figure 5:
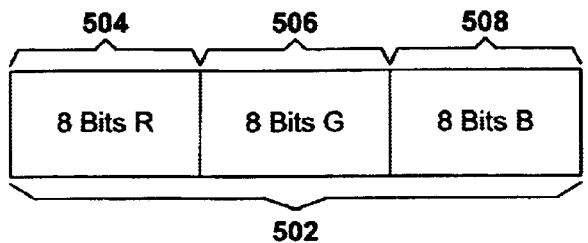
FIG. 5 shows the content of a prior art video data stream.
Figure 6:
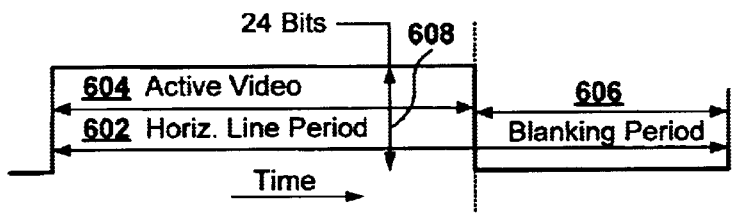
FIG. 6 shows the data that is sent for each horizontal line period of the prior art video data stream of FIG. 5.

FIGS. 5 and 6 show a prior art data stream. Although a 24 bit data word is shown, other prior art systems use 18 bits or 12 bits per pixel formats. These 18 bit and 12 bit prior art data streams can also be used with the encoding format of the present invention as well as the 24 bit embodiment described.

FIG. 5 shows, at 502, a 24 bit data word, 8 bits of data 504 represented Red video, 8 bits of data 506 representing Green video and 8 bits of data 508 representing Blue video.

In the timeline of FIG. 6, the horizontal line period is represented by line 602 and is the time between consecutive line scans. The active video time is represented by line 604 and the blanking period, during which video is not displayed on the screen is represented by line 606. Line 608 represents that for each displayed pixel, (that is, for each pixel clock period) 24 bits of data are sent.

For each of the data stream formats now described, the data width is increased from the 24 bit width for the raw data to a greater width so as to include items such as bus data (IEEE1394, USB, DDC), headers, run length limiting, error correction, calibration data and flags.

Figure 7:
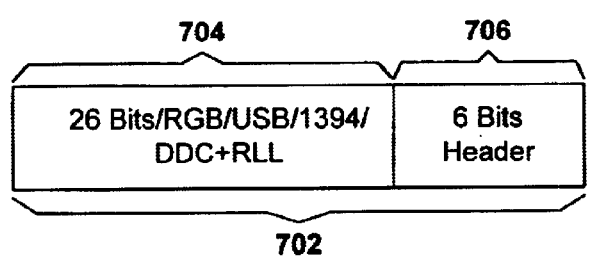
FIG. 7 shows the content of a video data stream using a 32 bit data width.
Figure 8:
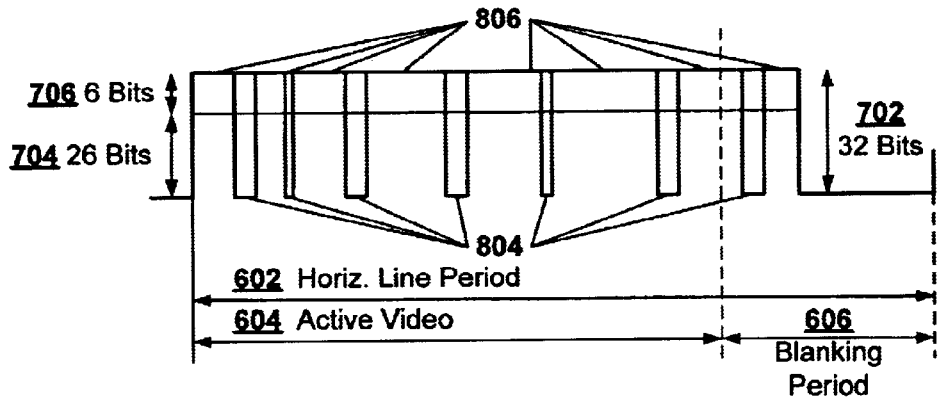
FIG. 8 shows the data that is sent for each horizontal line period of the video data stream of FIG. 7 in which the channel bandwidth is allocated asynchronously on an "as required basis"

FIGS. 7 and 8 show a data stream format which uses a 32 bit data width and the channel bandwidth is allocated asynchronously between video, USB, IEEE1394 and DDC data on an "as required basis", each data type being indicated by the appropriate header. The video pixel clock remains unaltered causing the video and bus information to spill into blanking period. The video information requires buffering to allow it to be retimed.

FIG. 7 shows, at 702, a 32 bit data width, 26 bits 704 representing Red, Green and Blue video data or USB data or IEEE 1394 data or DDC data as well as RLL data and 6 bits 706 representing header and error correction data. The header identifies which of the various types of data are contained within the 26 bits 704.

In the timeline of FIG. 8, the horizontal line period is represented by line 602 and is the time between consecutive line scans. The line 702 represents that for each displayed pixel, (that is, for each pixel clock period) 32 bits of data are sent, although the data being sent at a given time does not always relate to the particular pixel being displayed at that given time. The 32 bits shown at 702 in FIG. 8 represent the 26 bits of data 704 and the 6 bits of data 706 from FIG. 7. The data shown at 806 represents video information containing Red, Green and Blue video data. The data shown at 804 represents the other data, including USB data, IEEE 1394 data, DDC data as well as RLL data. Time slots are allocated for such data asynchronously, on an "as required basis", with the 6 bit header indicating the type of the data.

Figure 9:
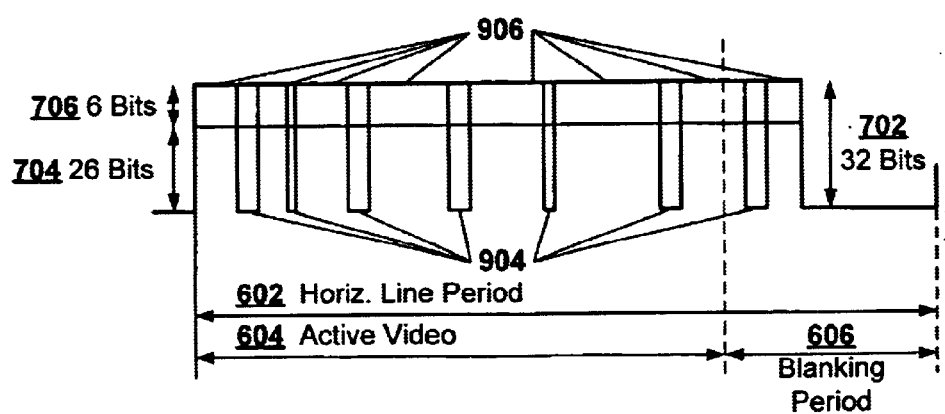
FIG. 9 shows a variation of the embodiment of FIG. 8 in which the bus information is allocated isochronous bandwidths, that is, the channel allocation between bus requirements and video is pre-determined.

FIG. 9 shows a variation of the embodiment of FIGS. 7 and 8 in which the bus information is allocated isochronous bandwidth in order to meet the maximum latency requirement for acknowledgements and lock conditions. As with the data stream format of FIGS. 7 and 8 the video pixel clock remains unaltered and video data spills over into the video blanking period. In addition to the requirements of the data stream formats of FIGS. 7 and 8, data buffering is needed as well as video buffering, however the coding arrangement is reduced in complexity since the location of the data channels in the composite data stream is known. The data shown at 806 represents video information containing Red, Green and Blue video data. The data shown at 804 represents the other data, including USB data, IEEE 1394 data, DDC data as well as RLL data. Time slots are allocated for such data isochronously.

In the first data stream format of FIGS. 7 and 8 and the second data stream format of FIG. 9, the only differentiator is the latency in the data. The advantage inherent in the data stream format of FIG. 9 is that the decoder knows where in the video data stream the bus data lies, whilst in the data stream format of FIGS. 7 and 8, the decoder does not. In the data stream format of the data stream of FIGS. 7 and 8, extra decoding is added to read each header to determine whether a word is video or bus data.

The present invention is a data structure in which a long data word, in the preferred embodiment, 32 bits, is separated into 4 different data streams of 8 bits each for the purpose of reducing data transmission rates. Each channel has only to work at a rate which is one-quarter the data rate that a single channel carrying a 32 bit word would require. In the preferred embodiment, only 1 channel, in this case channel 3, is required to guarantee a transition in each 8 bit word. The transition is required to achieve clock recovery. The advantage over a single 32 bit channel is that the overhead to achieve clock recovery is reduced by ⅓, thus increasing the efficiency of the system and further reducing data rates. The data structure can be extended to cover many data word lengths with the advantages described above.

In the data structure of the present invention, information which is critical to the successful operation of the data link is carried in channel 3. Channel 3 is the most significant bit of each 4 bit parallel word which is carried over the system and therefore when decoded is most noise resistant. For the purposes of the video display for which this system is primarily designed, critical information that is contained on channel 3 is the horizontal and vertical synchronisation signals, the calibration data and the initialisation codes, in particular, the data start codes.

Figure 10:
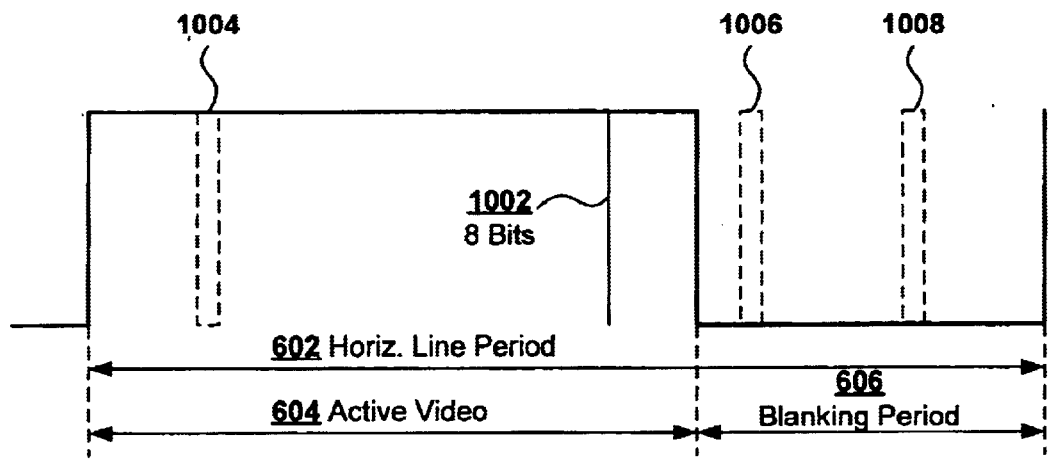
FIG. 10 shows the relative positioning of types of word in a data stream according to the present invention.

FIG. 10 shows how the data structures are defined to carry the data across the link at different points in the video data cycle. Illustrated in FIG. 10 is a single channel of 8 bits, there are four of the structures of FIG. 10 in total. 2 bits of data are transferred from parallel-serial multiplex encode (302 in FIG. 3) to electro-optical converter (314 in FIG. 3) as four digital channels, each of 8 bits. The four digital channels are transmitted as 1 of 16 possible optical light levels. Channel 3 is transmitted as the most significant bit of each light level and channel 0 as the least significant bit. Each bit of data associated with each channel is transmitted sequentially with the bit 7s of each of the four channels being transmitted at the same time, encoded as 1 of 16 light levels, followed by the bit 6s of each of the four channels and so on until the bit 0s of each of the four channels have been transmitted. The transmission sequence is then repeated with the next 32 bits of data being transmitted.

At 1002 is shown an 8 bit data width for each of the four channels, the data in each of the four channels representing different types of data according to the contents of a header transmitted as part of the data on channel 3. In the timeline of FIG. 10, the horizontal line period is represented by line 602 and is the time between consecutive line scans. The active video time is represented by line 604 and the blanking period, during which video is not displayed on the screen, is represented by line 606.

At 1004 is shown a word of type 7A, transmitted when the data link is carrying video information and described with reference to FIG. 11. At 1006 are shown words of type 7B/7C, transmitted when the data link is carrying video synchronisation information and described with reference to FIG. 12. At 1008 is shown a word of type 7D, transmitted when the data link is carrying calibration information and described with reference to FIG. 13.

Figure 11:
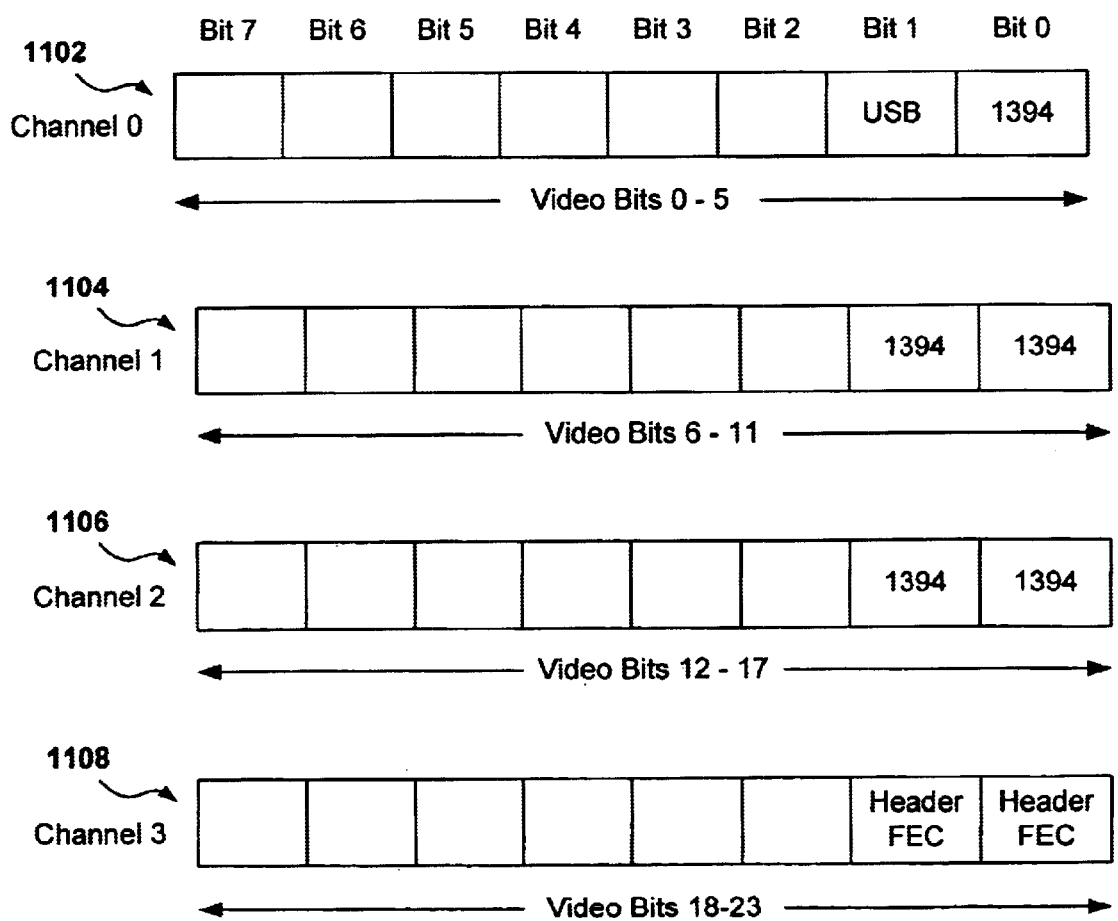
FIG. 11 shows a data word according to the present invention containing video data.

Referring to FIG. 11, a word type 7A is shown. This word type is transmitted during the period when the channel is carrying video information. The data transmitted comprises 24 bits of video data, 8 bits for each of the primary colours red, green and blue, 5 bits of IEEE1394 data and 1 bit of USB data. Channel 3 carries 2 bits which are decoded to indicate that a word type 7A is being transmitted and so the data is predominantly video data with IEEE1394 and USB data. In FIG. 11, channel 0 is shown at 1102, channel 1 is shown at 1104, channel 2 is shown at 1106 and channel 3 is shown at 1108. For each of the channels shown, bits 2 to 7 contain video data. For channel 0, bit 1 contains USB data and bit 0 contains IEEE1394 data. For channels 1 and 2, bits 1 and 0 contain IEEE1394 data. For channel 3, bits 1 and 0 contain header data, in this case indicating that video data is being transmitted.

Figure 12:
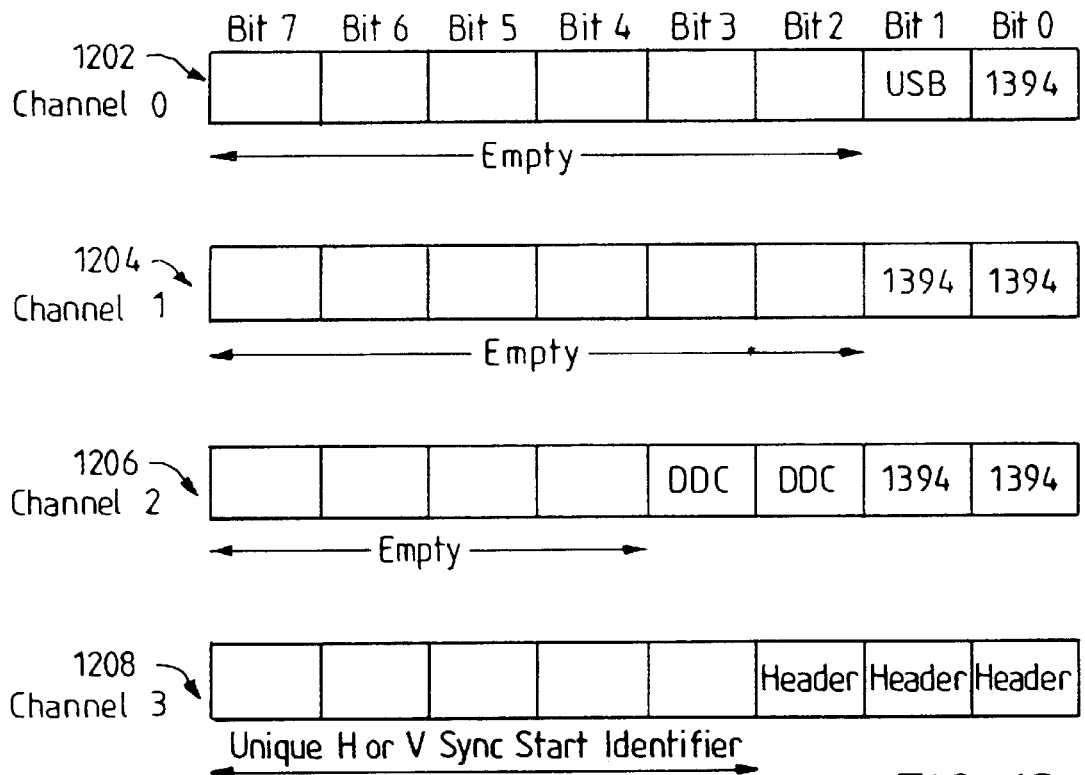
FIG. 12 shows a data word according to the present invention containing sync data.

Referring to FIG. 12, a word type 7B or type 7C is shown. This word type is transmitted to indicate horizontal sync start or to indicate vertical sync start. The data transmitted comprises 5 bits of IEEE1394 data, 1 bit of USB data and 2 bits of DDC data. Channel 3 carries 2 bits which are decoded to indicate that a word type 7B or a type 7C is being transmitted and so the data indicates a sync start with IEEE1394, USB and DDC data also being transmitted.

In FIG. 12, channel 0 is shown at 1202, channel 1 is shown at 1204, channel 2 is shown at 1206 and channel 3 is shown at 1208. For each of channels 0 and 1, bits 2 to 7 contain no data in the present embodiment. For channel 2, bits 4 to 7 contain no data in the present embodiment. For future embodiments, data may be defined for these bits, such that other information, such as system control data, may be carried during the video blanking period. For channel 0, bit 1 contains USB data and bit 0 contains IEEE1394 data. For channel 1, bits 1 and 0 contain IEEE1394 data. For channel 2, bits 1 and 0 contain IEEE1394 data and bits 3 and 2 contain DDC data. For channel 3, bits 1 and 0 contain header data, bit 2 contains additional header information used for word types other than 7A to indicate the type of data being sent over the link and bits 7 to 3 contain a unique identifier for a horizontal sync start or a vertical sync starts Both vertical and horizontal sync pulses are critical to the display operation and are substantially protected from errors by being transmitted as the most significant bit on the data link.

Figure 13:
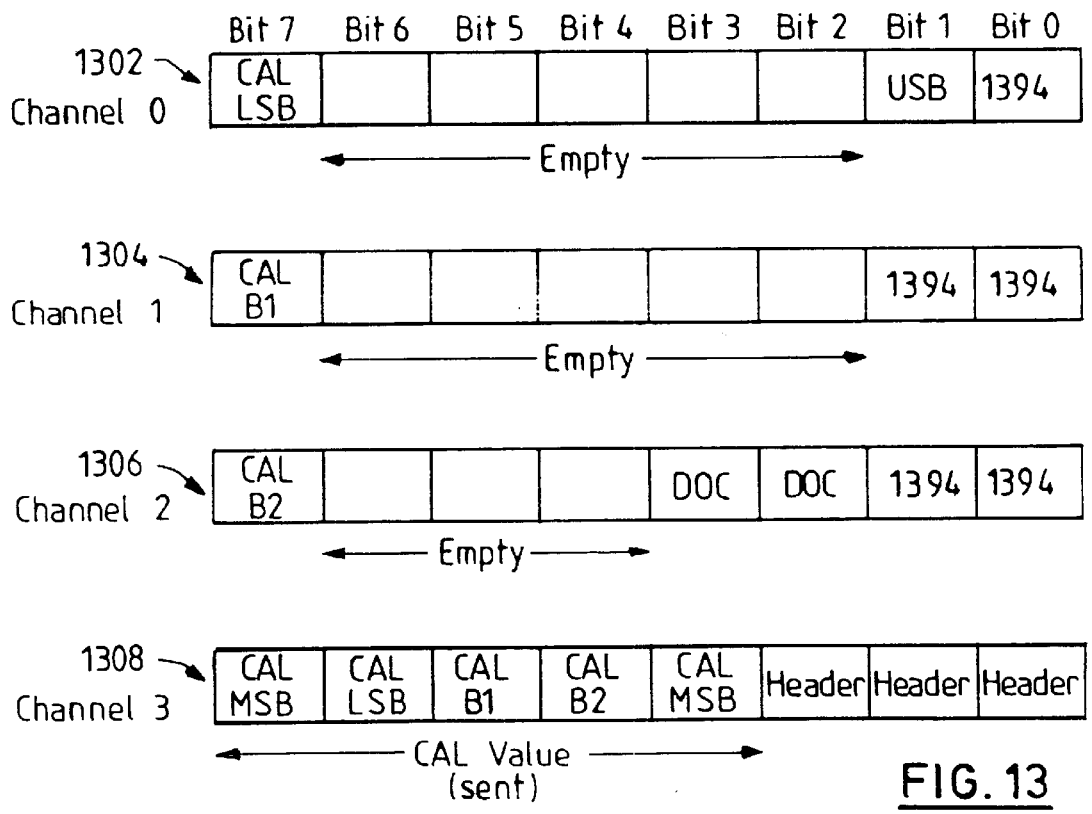
FIG. 13 shows a data word according to the present invention containing calibration data.

Referring to FIG. 13, a word type 7D is shown. This word type is transmitted to indicate that the link is to be calibrated. The data transmitted comprises 5 bits of IEEE1394 data, 1 bit of USB data and 2 bits of DDC data as well as 8 bits of calibration data. Channel 3 carries 2 bits which are decoded to indicate that a word type 7D is being transmitted and so the data indicates calibration with IEEE1394, USB and DDC data also being transmitted.

In FIG. 13, channel 0 is shown at 1302, channel 1 is shown at 1304, channel 2 is shown at 1306 and channel 3 is shown at 1308. For each of channels 0 and 1, bits 2 to 6 contain no data in the present embodiment. For channel 2, bits 4 to 6 contain no data in the present embodiment. For future embodiments, data may be defined for these bits, such that other information, such as system control data, may be carried during calibration. For channel 0, bit 1 contains USB data and bit 0 contains IEEE1394 data. For channel 1, bits 1 and 0 contain IEEE1394 data. For channel 2, bits 1 and 0 contain IEEE1394 data and bits 3 and 2 contain DDC data. For channel 3, bits 1 and 0 contain header data, bit 2 contains additional header information used for word types other than 7A to indicate the type of data being sent over the link.

As the link can have 16 analogue levels transmitted, calibration in order to ensure that those levels are correctly interpreted is necessary from time to time. In the preferred embodiment, channel 3 carries the actual four bit level being transmitted in bits 3 to 6. Since channel 3 is the most significant bit for each transmission, the noise immunity is high and the data is substantially protected from errors. The four bit level is also transmitted dispersed in bit 7 of the four channels. In this way the receiver is able to check what is actually received for the four channels and carry out any minor changes in the threshold detection circuits. In a preferred embodiment, only levels 1, 2, 4 and 8 require calibration as the other levels are derived from these.

A unique code (Data Stamp) is reserved on Channel 3 to indicate that the system is at row 0, Pixel 0. This code is sent using bits 3 to 7.

During the initial startup of the system channel 3 is used to carry data required for pre-operative system testing at which time all 4 digital data channels are driven identically.

What is claimed is:

1. Apparatus comprising:
   a circuit which produces an isochronous output data stream in which a single n bit word is transmitted as m multiple synchronous data streams where the length of the word transmitted in each data stream is n/m, the output data stream containing multiple isochronous different data rate data streams and one or more asynchronous data stream or streams, wherein one bit from each of the m multiple synchronous data streams are combined and transmitted as a single signal at one of $2^m$ analog levels.

2. Apparatus of claim 1 wherein data which is desired to have a lower error rate than other data is transmitted in the synchronous data stream corresponding to the most significant bit associated with the $2^m$ analog levels.

3. Apparatus of claim 2 wherein calibration data is transmitted in the synchronous data stream corresponding to the most significant bit associated with the $2^m$ analog levels, said calibration data also being transmitted distributed over each of the synchronous data streams.

4. Apparatus of claim 1 wherein one or more data stream words contains data or control code which has been error detected and corrected.

5. Apparatus of claim 1 wherein one of the isochronous data streams is update or refresh data to a display transducer or update or refresh data from a sensor.

6. Apparatus of claim 1 wherein one of the isochronous data streams is isochronous IEEE1394 data or USB data or STM data or RS-442 data.

7. Apparatus of claim 1 wherein one or more of the asynchronous data steams is Asynchronous IEEE 1394 data or Asynchronous USB data or DDC data or I²C data or ATM data.

8. Apparatus of claim 1 wherein n=32 and m=4.

9. Apparatus comprising;
   a circuit which produces an isochronous output data stream In which a single n bit word is transmitted as m multiple synchronous data streams where the length of the word transmitted in each data stream is n/m, the output data stream containing multiple isochronous different data rate data streams and one or more asynchronous data stream or streams, wherein one bit from each of the m multiple synchronous data streams are combined and transmitted as a single signal at one of $2^m$ analog levels and wherein the one or more of the data streams contains a code which has been run length limited or has a zero running digital sum with a banded disparity.

10. Apparatus of claim 9 wherein one or more data stream words contains data or control code which has been error detected and corrected.

11. Apparatus of claim 9 wherein one of the isochronous data streams is update or refresh data to a display transducer or update or refresh data from a sensor.

12. Apparatus of claim 9 wherein one of the isochronous data streams is isochronous IEEE1394 data or USB data or STM data or RS-442 data.

13. Apparatus of claim 9 wherein one or more of the asynchronous data steams is Asynchronous IEEE1394 data or Asynchronous USB data or DDC data or I²C data or ATM data.

14. Apparatus of claim 9 wherein n=32 and m=4.

* * * * *